United States Patent [19]

Nicholas et al.

[11] 4,242,108

[45] Dec. 30, 1980

[54] HYDROGEN SULFIDE CONCENTRATOR FOR ACID GAS REMOVAL SYSTEMS

[75] Inventors: David M. Nicholas, New Tripoli; William P. Hegarty, Wescosville, both of Pa.

[73] Assignee: Air Products and Chemicals, Inc., Allentown, Pa.

[21] Appl. No.: 91,882

[22] Filed: Nov. 7, 1979

[51] Int. Cl.$^3$ ............................................. B01D 19/00
[52] U.S. Cl. .......................................... 55/40; 55/53; 55/68; 55/73
[58] Field of Search ...................... 55/40–43, 55/53, 68, 73; 423/220, 221–223, 226–229, 233

[56] References Cited

U.S. PATENT DOCUMENTS

| | | | |
|---|---|---|---|
| 3,362,133 | 1/1968 | Kutscher et al. | 55/44 |
| 3,710,546 | 1/1973 | Gruneweld et al. | 55/42 |
| 3,767,766 | 10/1973 | Tjoa et al. | 55/73 |
| 3,989,811 | 11/1976 | Hill | 55/73 |

*Primary Examiner*—Bernard Nozick

*Attorney, Agent, or Firm*—E. Eugene Innis; Douglas G. Glantz; James C. Simmons

[57] ABSTRACT

A novel method is disclosed for treating a contaminated gas such as a contaminated natural gas or a synthesis product gas from the partial oxidation of petroleum or coal to concentrate and remove hydrogen sulfide at a reduced energy and capital requirement. Hydrogen sulfide in the contaminated stream is absorbed to form a hydrogen sulfide rich solvent which includes co-absorbed carbon dioxide, which is then removed to prevent dilution of the concentrated hydrogen sulfide formed when the solvent is regenerated. The solvent leaving the hydrogen sulfide absorber is heated before entering a high pressure stripper column wherein the co-absorbed carbon dioxide is stripped from the solvent, preferably by stripping with nitrogen or a portion of the product gas, and the carbon dioxide is recycled to the hydrogen sulfide absorber. The CO$_2$ stripper is operated at a pressure not substantially below the pressure of the hydrogen sulfide absorber, eliminating the need for large compressors required in conventional methods to recycle the carbon dioxide.

11 Claims, 1 Drawing Figure

HYDROGEN SULFIDE CONCENTRATOR FOR ACID GAS REMOVAL SYSTEMS

BACKGROUND OF THE INVENTION

This invention relates to a method for concentrating and removing hydrogen sulfide from a contaminated gas mixture containing hydrogen sulfide and carbon dioxide, such as may be found in contaminated natural gas or the contaminated product gas from coal gasification or from the partial oxidation of petroleum.

Numerous processes for removing hydrogen sulfide and carbon dioxide from gaseous mixtures involving physical absorption are well known. Kutsher et al, U.S. Pat. No. 3,362,133, discloses a process for removing hydrogen sulfide and carbon dioxide by physical absorption in the dialkylether of a polyalkylene glycol and then flashing the solvent at a pressure substantially lower than the absorber to release any co-absorbed $CO_2$, which is recycled to the absorber. The flashing step separates $CO_2$ from the solvent, but any recycle can be effected only by compressing the $CO_2$ before it can be recycled into the absorber which is at a substantially higher pressure than the flashed $CO_2$. Tjoa et al., U.S. Pat. No. 3,767,766, uses a process similar to Kutsher and shows passing the solvent through an expansion valve to flash and vaporize dissolved $CO_2$ and/or hydrocarbons which may be recycled through a compressor to the absorber.

Hill, U.S. Pat. No. 3,989,811, shows a sulfur recovery process in which an absorbent containing $H_2S$ and $CO_2$ is heated and then stripped of $H_2S$ and $CO_2$ in a low pressure stripping column to regenerate the solvent. The stripped vapors are passed to a second $H_2S$ absorber to separate $CO_2$ from the $H_2S$, and the $CO_2$ is vented.

Child et al, U.S. Pat. No. 4,520,176, shows a process for removing acid gases including $CO_2$, $H_2S$, and COS, from a raw synthesis gas feed stream by physical absorption. The hydrogen sulfide rich absorbent is stripped in low pressure columns using a portion of the $H_2$-rich product gas stream as an optional stripping gas to regenerate purified solvent. The gas stream leaving the stripper is introduced into underground reservoirs to facilitate petroleum recovery.

The conventional processes for separating hydrogen sulfide and carbon dioxide from gaseous mixtures, as represented by the foregoing, are limited by the low pressure techniques of separating any co-absorbed carbon dioxide from the solvent rich in absorbed hydrogen sulfide, such as by expansion and flashing or by low pressure stripping columns. Using the conventional methods, large and costly compressors are required to effect a recycle back to an $H_2S$ absorber which necessarily can be operated only at a pressure substantially higher than the pressure in the flashing separation vessel.

An object of this invention is to overcome the limitations of the conventional processes and provide for an efficient separation of any co-absorbed carbon dioxide in the hydrogen sulfide rich solvent leaving the $H_2S$ absorber. It is a further object of this invention to provide for an efficient separation and removal of said co-absorbed $CO_2$ without the need for large and expensive compressors to recycle any stripped $CO_2$ into the high pressure $H_2S$ absorber. It is a further object of this invention to provide for the use of the portion of the product gas from the contemplated gas cleanup as the stripping gas in the $CO_2$ stripper for removing any co-absorbed $CO_2$ from the hydrogen sulfide rich solvent. It is yet a further object of this invention to adjust the portion of product gas used in the $CO_2$ stripper so as to provide for a $H_2S$ concentration higher than conventional methods in the product Claus gas for use in a sulfur recovery unit.

SUMMARY OF THE INVENTION

According to our invention a contaminated natural gas or synthesis gas mixture having components of hydrogen sulfide and carbon dioxide, is passed through a hydrogen sulfide absorber to remove the hydrogen sulfide and which also removes a portion of the carbon dioxide. Methane, hydrogen, and/or a mixture of hydrogen and carbon monoxide and the remaining carbon dioxide are withdrawn from the top of the $H_2S$ absorber, and $CO_2$ is removed to form a product gas. The hydrogen sulfide rich solvent leaving the absorber is heated and then passed to a high pressure $CO_2$ stripping column wherein any co-absorbed $CO_2$ is stripped from the solvent using any stripping gas such as nitrogen from an air separation plant, or preferably an adjustable portion of the product gas. The stripped $CO_2$ then is recycled to the $H_2S$ absorber without the need for large compressors to bring the $CO_2$ back up to the pressure necessary for admission into the $H_2S$ absorber. The hydrogen sulfide rich solvent leaving the $CO_2$ stripper then may be regenerated to provide a high $H_2S$ concentration Claus gas and a purified solvent.

DETAILED DESCRIPTION

Figure 1:
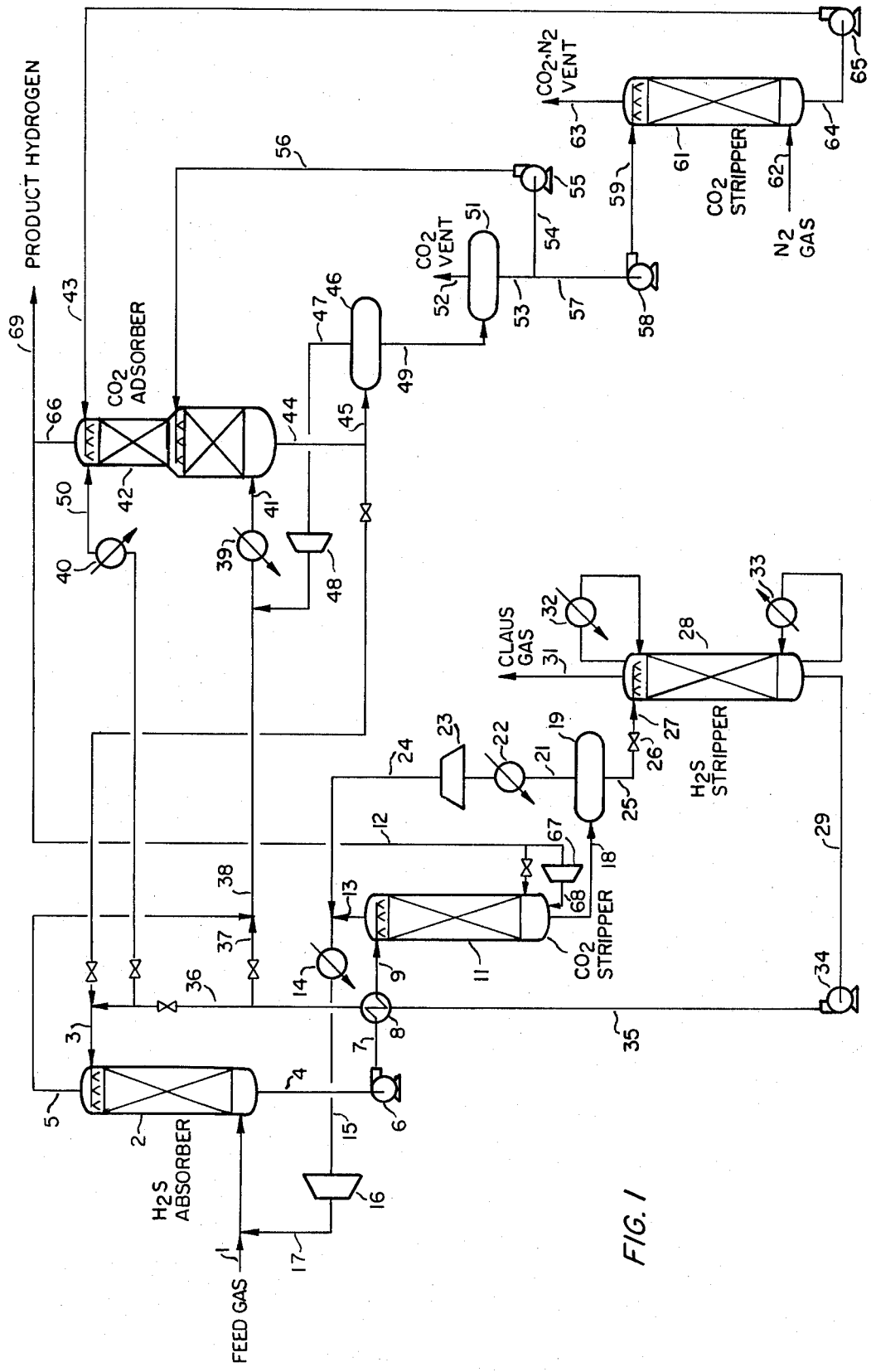
FIG. 1 is a simplified schematic diagram of a process system for a practical operation in the practice of the novel method according to the invention.

Reference is directed to FIG. 1 wherein the novel method of the invention is illustrated by a simplified block flow diagram. A feed gas such as a contaminated natural gas containing methane or a contaminated synthesis gas containing hydrogen such as from a shifted product gas mixture from a coal gasification process or a partial oxidation of petroleum, at a pressure between 400 and 2,500 psia, and preferably between 600 and 1,000 psia, and also more particularly containing components of carbon dioxide, and hydrogen sulfide, and which may also contain carbon monoxide, argon, nitrogen, carbonyl sulfide, and water, is passed in stream 1 to an $H_2S$ absorber 2. The feed gas is contacted with a liquid absorbent, preferably having a higher selectivity for absorbing $H_2S$ over $CO_2$, which enters the top of $H_2S$ absorber in line 3. Hydrogen sulfide is absorbed and, along with any co-absorbed $CO_2$, leaves the $H_2S$ absorber in the liquid solvent in line 4. Vapors which are not absorbed in the liquid solvent, such as carbon dioxide; methane, particularly in the case when the feed gas is a contaminated natural gas; and hydrogen or a mixture of hydrogen and carbon monoxide, particularly in the case when the feed gas is a contaminated synthesis gas; leave the $H_2S$ absorber in line 5.

The solvent leaving the bottom of the $H_2S$ absorber in line 4 is pumped at 6 and passed in line 7 to be heated in exchanger 8 before entering in line 9 the top of a high pressure $CO_2$ stripper column 1 at a pressure not substantially below the pressure in $H_2S$ absorber 2. A stripping gas, such as nitrogen or a portion of the product gas from downstream processing, which will be predominantly methane when the feed gas is natural gas and which will be hydrogen or a mixture of hydrogen and carbon monoxide when the feed is a synthesis gas, is admitted in line 12 to the bottom of $CO_2$ stripper 11. The stripping gas in line 12 can be $N_2$ from an air separation plant such as in the case of the $H_2$ product gas being used as a feed to an ammonia plant. $CO_2$ rich gas is stripped from the liquid solvent and leaves the $CO_2$ stripper as overhead in line 13 which must be recycled to $H_2S$ absorber 2 to remove any $H_2S$ contained in this gas stream. The $CO_2$ rich gas in line 13, at a pressure not substantially below that pressure used in line 1, is cooled at 14. $CO_2$ rich gas leaving cooler 14 in line 15 is compressed slightly at 16 to make up for minor pressure losses and is recycled in line 17 to join the feed gas in line 1.

Hydrogen sulfide rich absorbent leaves the bottom of the $CO_2$ stripper 11 in line 18 and is flashed at 19 whereupon coabsorbed gas, such as hydrogen, methane, carbon dioxide, and carbon monoxide, is removed for recovery in line 21, is cooled in exchanger 22, recompressed at 23, and recycled in line 24 by admixing with the $CO_2$ recycle in line 13. The hydrogen sulfide rich solvent leaves the flash vessel as line 25 and is expanded in a Joule-Thompson expansion valve 26 and passed in line 27 to $H_2S$ stripper 28 wherein the solvent is regenerated and leaves the bottom as purified solvent in line 29. Concentrated $H_2S$ leaves the top of the $H_2S$ stripper in line 31 and may be delivered as a Claus gas having a high $H_2S$ concentration to a sulfur recovery unit. Steam is generated in reboiler 33 to strip the $H_2S$, and condenser 32 condenses the water at the top of stripper 28.

Lean solvent leaving the bottom of the $H_2S$ stripper in line 29 is passed through pump 34 and passes in line 35 in indirect heat exchange with solvent in line 7 in heat exchanger 8. After losing heat to solvent in line 7, the purified solvent can either join line 3 in line 36 or preferably as line 37 joins the vapors in line 5 to form a vapor-liquid stream in line 38 or further can optionally be used after refrigeration in exchanger 40 as absorber feed in line 50 to the top of $CO_2$ absorber 42.

Solvent and the gases from the overhead of the $H_2S$ absorber in line 38 are cooled in exchanger 39 and enter the bottom of a $CO_2$ absorber 42 through line 41. A pure liquid absorbent enters the top of $CO_2$ absorber 42 in line 43. $CO_2$ is absorbed, and a $CO_2$ rich liquid absorbent leaves the bottom of the $CO_2$ absorber in line 44. A portion of the $CO_2$ rich liquid absorbent in line 44 is passed in line 3 to the top of $H_2S$ absorber 2. The remaining $CO_2$ rich solvent in line 45 is flashed in flash vessel 46. Co-absorbed gas which is flashed in vessel 46 is conveyed in line 47 through compressor 48 and admixed with the solvent and vapors in line 38.

$CO_2$ rich liquid absorbent leaves the bottom of the flash vessel 46 in line 49 and is flashed in flash vessel 51. Carbon dioxide gas leaves the flash vessel 51 through line 52 and may be vented. Liquid absorbent leaves the flash vessel 51 through line 53 and is split so that a portion can be passed in line 54 through pump 55 to $CO_2$ absorber 24 and enters at an intermediate portion of the absorber.

A second portion of the liquid absorbent leaving flash vessel 51 in line 53 is passed in line 57 through pump 58 to the top of a $CO_2$ stripper 61 in line 59. Nitrogen gas which can be supplied from an air separation plant is passed in line 62 to the bottom of $CO_2$ stripper 61. Waste nitrogen and carbon dioxide leaves the top of $CO_2$ stripper 61 in line 63 and can be vented. Lean liquid absorbent leaves the bottom of $CO_2$ stripper 61 in line 64 and is passed through pump 65 before passing to and entering the top of $CO_2$ absorber 42 in line 43.

Product gas leaves the top of $CO_2$ absorber 42 in line 66. A portion of the product gas in line 66 is passed in line 12 to the bottom of $CO_2$ stripper 11 and serves as the stripping gas. The gas in line 12 optionally can be slightly compressed at 67 to increase the stripping gas pressure in line 68 by 10–30 psi before entering $CO_2$ stripper 11, which slight compression will eliminate the need for compressor 16. Hydrogen product gas leaves the process in line 69.

The portion of the product gas used as a stripping gas in the high pressure $CO_2$ stripping column can be adjusted to give a higher concentration of hydrogen sulfide in the Claus gas particularly in comparison with conventional methods for concentrating and removing $H_2S$ from contaminated natural gas or synthesis gas. Increasing product gas volumes used as a stripping gas will increase the concentration of hydrogen sulfide from the $H_2S$ stripper and provide for a more efficient sulfur recovery.

The $CO_2$ stripper column is operated at a pressure not substantially below the pressure of the hydrogen sulfide absorber, thereby eliminating requirements for large compressors to recycle the carbon dioxide back to the high pressure $H_2S$ absorber. For example, operation of the $CO_2$ stripper column 11 at a pressure about 10 to 30 psi below the pressure in hydrogen sulfide absorber 2 is suitable.

Other advantages of the novel method according to this invention may be seen from an inspection of the following example.

EXAMPLE

The following example is offered for a better understanding of the present invention, but the invention is not to be construed as limited thereto. This example is applied to a plant which processes a feed gas comprised of:

|  | Mole % |
|---|---|
| Carbon Monoxide | 0.40 |
| Hydrogen | 62.62 |
| Carbon Dioxide | 35.46 |
| Methane | 0.36 |
| Argon | 0.34 |
| Nitrogen | 0.07 |
| Hydrogen Sulfide | 0.55 |
| Carbonyl Sulfide | 0.003 |
| Water | 0.20 |

The feed gas is introduced into the $H_2S$ absorber 2 at a pressure of about 654 psia and at about 104° F. The fresh feed flow rate is designed at about 13,120 lb. moles gas per hour, to which is added 1040 lb. moles gas per hour of recycle gas in line 17. The solvent stream from the bottom of the $CO_2$ absorber 42 is introduced at about 40° F. into absorber 2 by line 3 at a rate to provide 1350 lb. moles/hour of solvent comprised of dimethyl ether of polyethylene glycol. In addition to the organic solvent, the stream also contains carbon dioxide (35.1 mole %), water (17.7 mole %), and various other components in small concentrations. As the solvent flows down absorber 2 most of the $H_2S$ in the feed gas is absorbed along with other co-absorbed species resulting in an essentially H₂S free overhead in line 5. The rich solvent leaving absorber 2 in line 4 at a flow rate of 3010 lb. moles/hour is comprised of:

|  | Mole % |
|---|---|
| Carbon Monoxide | 0.01 |
| Hydrogen | 0.60 |
| Carbon Dioxide | 31.20 |
| Methane | 0.02 |
| Argon | — |
| Nitrogen | — |
| Hydrogen Sulfide | 4.51 |
| Carbonyl Sulfide | 0.008 |
| Water | 18.78 |
| Dimethyl Ether of polyethylene glycol | 44.88 |

The rich solvent in line 4 at a temperature of about 75° F. and pressure of 654 psia is increased in pressure to about 660 psia in pump 6 before passing in line 7 into heat exchanger 8. The rich solvent is heated in exchanger 8 to between 265° F. and 300° F. by indirect heat exchange with line 35 before passing into stripper 11 in line 9. A maximum of 1% of the product hydrogen in line 66 is by-passed in line 12 to serve as a strip gas in absorber 11. The gas in line 12, at about 15.5° F. and 639 psia, also contains carbon monoxide (0.62 mole %), methane (0.55 mole %), argon (0.53 mole %), nitrogen (0.12 mole %), and small concentrations of other compounds. The total flow of stream 12 into absorber 11 is a maximum of 85 lb. moles/hour. As the hydrogen strip gas passes up absorber 11 the carbon dioxide is stripped from the solvent along with small amounts of other absorbed species. The compositions of the vapor leaving stripper 11 in line 13 and the composition of liquid stream 18 at the bottom of stripper 11 are comprised of:

|  | Stream 13 (mole %) | Stream 18 (mole %) |
|---|---|---|
| Carbon Monoxide | 0.06 | 0.01 |
| Hydrogen | 8.15 | 1.06 |
| Carbon Dioxide | 83.58 | 6.45 |
| Methane | 0.07 | 0.02 |
| Argon | 0.04 | — |
| Nitrogen | 0.01 | — |
| Hydrogen Sulfide | 5.64 | 3.81 |
| Carbonyl Sulfide | 0.01 | — |
| Water | 2.40 | 25.38 |
| Dimethyl Ether of Polyethylene Glycol | — | 63.27 |

The rich solvent in line 18 at about 262° F. and 639 psia now contains considerably less carbon dioxide than the solvent leaving absorber 2 in line 4. The liquid, in line 18, at a flow rate of about 2134 lb. moles/hour, is then flashed down to a pressure in the range of 200-300 psia in flash drum 19 to desorb hydrogen from the solvent. The liquid leaving flash drum 19 at about 260° F. passes through a Joule-Thomson valve 26 before entering H₂S stripper 28 where steam is used to regenerate the solvent and to produce a Claus gas in line 31 containing at least 40 mole % hydrogen sulfide. The lean solvent in line 29 is increased in pressure through pump 34 and after heat exchange in exchanger 8 is mixed with line 5. The vapor leaving flash drum 19 in line 21 at about 260° F. and at a flow rate of about 83 lb. moles/hour is comprised of:

|  | Moles % |
|---|---|
| Carbon Monoxide | 0.23 |
| Hydrogen | 23.13 |
| Carbon Dioxide | 59.98 |
| Methane | 0.25 |
| Argon | 0.03 |
| Nitrogen | 0.01 |
| Hydrogen Sulfide | 10.82 |
| Carbonyl Sulfide | 0.02 |
| Water | 5.47 |
| Dimethyl Ether of Polyethylene Glycol | 0.06 |

The vapor in line 21 is cooled to about 105° F. in heat exchanger 22 with cooling water before passing through compressor 23 to give a pressure in line 24 of 635 psia. The vapor in line 24 is mixed with the vapor in line 13, and this mixture is cooled in heat exchanger 14 to about 105° F. in line 15 before passing through compressor 16 to give the same pressure as the feed gas in line 1.

An advantage of using the novel method according to our invention in the process described in this example is that the compressors used in recompressing the desorbed CO₂ are much smaller than those used in conventional methods of concentrating the Claus gas. Because CO₂ stripper 11 is maintained at a relatively low pressure differential compared to H₂S absorber 2 (19 psia), the bulk of the CO₂ desorbed from the solvent in line 13 requires a small pressure differential of compression (24 psia) in compressor 16 to reach the inlet feed pressure. Thus about 92% of the total gas in line 17 is compressed over a relatively small pressure differential of compression compared to conventional flash recompression schemes where most of the desorbed gas would be compressed over pressure differentials of compression up to 550 psia.

A further advantage of using the novel method described in this example according to our invention is that a flexibility is provided to increase the H₂S concentration in the Claus gas with minimal incremental costs. By adjusting the H₂ flow in line 12, more CO₂ can be desorbed from the solvent in stripper 11, and thus a higher H₂S Claus gas concentration is achieved in line 31.

What is claimed is:

1. A method of removing hydrogen sulfide from a contaminated gas mixture comprising hydrogen sulfide, carbon dioxide, and a gas selected from the group consisting of hydrogen, methane, and a mixture of hydrogen and carbon monoxide, which method comprises:
   (a) contacting said contaminated gas mixture with a liquid absorbent in a first liquid-gas contacting zone to absorb said hydrogen sulfide and form a hydrogen sulfide rich liquid absorbent and an overhead gas, and thereby absorbing a portion of said carbon dioxide,
   (b) removing carbon dioxide from said overhead gas leaving said first contacting zone in a carbon dioxide absorber to form a product gas,
   (c) heating said hydrogen sulfide rich liquid absorbent leaving said first contacting zone to form a heated hydrogen sulfide rich liquid absorbent,
   (d) stripping carbon dioxide from said heated hydrogen sulfide rich liquid absorbent with a stripping gas in a second liquid-gas contacting zone to form a carbon dixoide rich gas and an effluent hydrogen sulfide rich liquid absorbent stream containing stripping gas, (e) cooling, compressing, and recycling said carbon dioxide rich gas to said first contacting zone, (f) separating stripping gas from said hydrogen sulfide rich liquid absorbent stream leaving said second contacting zone in a first liquid-gas separating zone to form a separated stripping gas and a stripped hydrogen sulfide rich liquid absorbent, and admixing said separated stripping gas with said carbon dioxide rich gas leaving said second contacting zone, (g) separating hydrogen sulfide from said stripped hydrogen sulfide rich liquid absorbent leaving said first separation zone in a second liquid-gas separation zone to form hydrogen sulfide gas and purified liquid adsorbent, and (h) recycling said purified liquid absorbent from said second liquid-gas separation zone to said first liquid-gas contacting zone with from 0 to 100 percent of said purified liquid adsorbent being recycled passing first through said carbon dioxide absorber.

2. A method according to claim 1 wherein said stripping in said second contacting zone is effected at a stripping pressure not substantially below a pressure in said first contacting zone.

3. A method according to claim 2 wherein said stripping gas is selected from the group consisting of a portion of said product gas and nitrogen.

4. A method according to claim 3 wherein said liquid adsorbent has a higher solubility selectivity for hydrogen sulfide than for carbon dioxide.

5. A method according to claim 4 wherein said stripping pressure in said second contacting zone is in the range of 400-2,500 psia.

6. A method according to claim 4 wherein said stripping pressure in said second contacting zone is in the range of 600-1,000 psia.

7. A method according to claim 6 wherein said heating includes heating by indirect heat exchange communication with said purified liquid absorbent leaving said second separation zone.

8. A method according to claim 7 wherein said removing carbon dioxide from said overhead gas leaving said first contacting zone comprises absorbing by said purified liquid absorbent in a $CO_2$ absorber prior to said recycling of said purified liquid absorbent to said first contacting zone.

9. A method according to claim 1 or 8 wherein said liquid adsorbent comprises dialkyl ether of polyethylene glycol.

10. A method according to claim 9 wherein said contaminated gas mixture comprises contaminated natural gas and wherein said product gas comprises methane.

11. A method according to claim 9 wherein said contaminated gas mixture comprises a contaminated synthesis gas from a partial oxidation of petroleum or coal, and wherein said product gas comprises a gas selected from the group consisting of hydrogen and a mixture of hydrogen and carbon monoxide.

* * * * *